United States Patent [19]

Johnson et al.

[11] Patent Number: 5,113,357
[45] Date of Patent: May 12, 1992

[54] METHOD AND APPARATUS FOR RENDERING OF GEOMETRIC VOLUMES

[75] Inventors: Elizabeth R. Johnson, Raleigh; Charles E. Mosher, Jr., Chapel Hill, both of N.C.

[73] Assignee: Sun Microsystems, Inc., Mountain View, Calif.

[21] Appl. No.: 707,985

[22] Filed: May 22, 1991

Related U.S. Application Data

[63] Continuation of Ser. No. 353,449, May 18, 1989, abandoned.

[51] Int. Cl.$^5$ .............................................. G06F 15/72
[52] U.S. Cl. ............................. 395/124; 364/413.13; 364/413.22; 340/729
[58] Field of Search ............... 364/522, 521, 413.16, 364/413.19, 413.22, 413.18; 340/729, 727

[56] References Cited

U.S. PATENT DOCUMENTS

| | | | |
|---|---|---|---|
| 4,674,046 | 6/1987 | Ozeki et al. | 364/414 |
| 4,685,070 | 8/1987 | Flinchbaugh | 364/522 |
| 4,729,098 | 3/1988 | Cline et al. | 364/414 |
| 4,737,921 | 4/1988 | Goldwasser et al. | 364/518 |
| 4,835,688 | 5/1989 | Kimura | 364/413.22 |
| 4,984,157 | 1/1991 | Cline et al. | 364/413.13 |
| 4,987,554 | 1/1991 | Kaufman | 364/522 |

FOREIGN PATENT DOCUMENTS

| | | |
|---|---|---|
| 0160848 | 11/1985 | European Pat. Off. |
| 0216156 | 4/1987 | European Pat. Off. |
| 2194656 | 3/1988 | United Kingdom |
| 2194715 | 3/1988 | United Kingdom |
| 2214037 | 8/1989 | United Kingdom |

OTHER PUBLICATIONS

Kaufman et al. "CUBE-An Architecture Based on a 3-D Voxel Map" Theoretical Foundation of Computer Graphics and CAD, Springer-Verlag 1988, 689-701.
Charles E. Mosher Jr., George W. Sherouse, Edward L. Chaney Julian G. Roseman, 3D Displays and User Interface Design for a Radiation Therapy Treatment Planning CAD Tool-Spie vol. 902, Three—Dimensional Imaging and Remote Sensing Imaging 1988, 64-71.
Karl Heinz Höhne, Ralph Bernstein, "Shading 3D-Images from CT Using Gray-Level Gradients"—IEEE Transactions on Medical Imaging, vol. M1 5, No. 1, Mar. 1986, pp. 45-47.
U. Tiede, M. Riemer, M. Bomans, K. H. Höhne Display Techniques for 3-D Tomographic Volume Data—NCGA 88 Conf. Proc., vol. 3 (1988), 188-197.

(List continued on next page.)

*Primary Examiner*—Heather R. Herndon
*Assistant Examiner*—Raymond J. Bayerl
*Attorney, Agent, or Firm*—Blakely Sokoloff Taylor & Zafman

[57] ABSTRACT

A method and apparatus is provided to directly render volumes from volume data whereby the resolution of the volume is not lost and the volume data is completely interactive with geometric data. The volume or portion of the volume to be rendered is aligned to a geometric primitive defined by a reference frame and a mapping function is generated relating the geometric primitive to the volume or volume portion. The mapping function relates each voxel in volume space to an element or point of the primitive. Thus, the volume is displayed as a function of the geometric primitive the volume or volume portion is mapping to. In the preferred embodiment the volume or portion of volume to be rendered is bound by one or more geometric primitives and a mapping is generated relating the geometric primitive, such as a 3-D polgon, to the volume. Thereafter, any geometric operation performed on the volume is accomplished by performing the operation on the geometric primitive and using the mapping function to translate the volume into geometry space whereby the volume data is displayed. By defining the volume as a function of geometric primitives such as a polygon, geometric operations, such as clipping or rotating, may be performed easily on the primitive and the data is used to look up through the mapping function to determine the corresponding volume data to be displayed.

48 Claims, 5 Drawing Sheets

OTHER PUBLICATIONS

Daniel S. Schlusselberg, M.D. Three-Dimensional Display of Medical Image Volumes—NCGA 86 Conf Proc., (Mar. 1986), 114-123.

William E. Lorenson, Harvey E. Cline Marching Cubes: A High Resolution 3D Surface Contruction Algorithm—Computer Graphics, vol. 21, No. 4, Jul., 1987.

Scott D. Roth, Ray Casting for Modeling Solids—Computer Graphics and Image Processing 18, 109-144 (1982).

Craig Upson, Michael Keeler, V-Buffer: Visible Volume Rendering—Computer Graphics, vol. 22, No. 4, Aug. 1988.

Paolo Sabella, A Rendering Algorithm for Visualizing 3D Scalar Fields, Computer Graphics, vol. 22, No. 4, Aug. 1988.

H. Fuchs, Z. M. Kedem and S. P. Uselton Optimal Surface Reconstruction from Planar Contours—Communications of the ACM, vol. 20, No. 10, Oct. 1977.

Dan Gordon, R. Anthony Reynolds Image Space Shading of 3-Dimensional Objects—Computer Vision, Graphics, and Image Processing 29, (1985) 361-376.

H. E. Cline, W. E. Lorensen, S. Ludke, C. R. Crawford and B. C. Teeter Two Algorithms for the Three-Dimensional Reconstruction of Tomograms-Med. Phys. 15(3), May/Jun. 1988, 320-327.

Robert A. Drebin, Loren Carpenter, Pat Hanrahan Volume Rendering—Computer Graphics, vol. 22, No. 4, Aug. 1988, 65-74.

Mark Levoy, Volume Rendering: Display of Surfaces from Volume Data, IEEE Computer Graphics & Applications—May 1988, 29-37.

James T. Kajiya, Brian P. Von Herzen Ray Tracing Volume Densities—Computer Graphics, vol. 18, No. 3, Jul. 1984, 165-173.

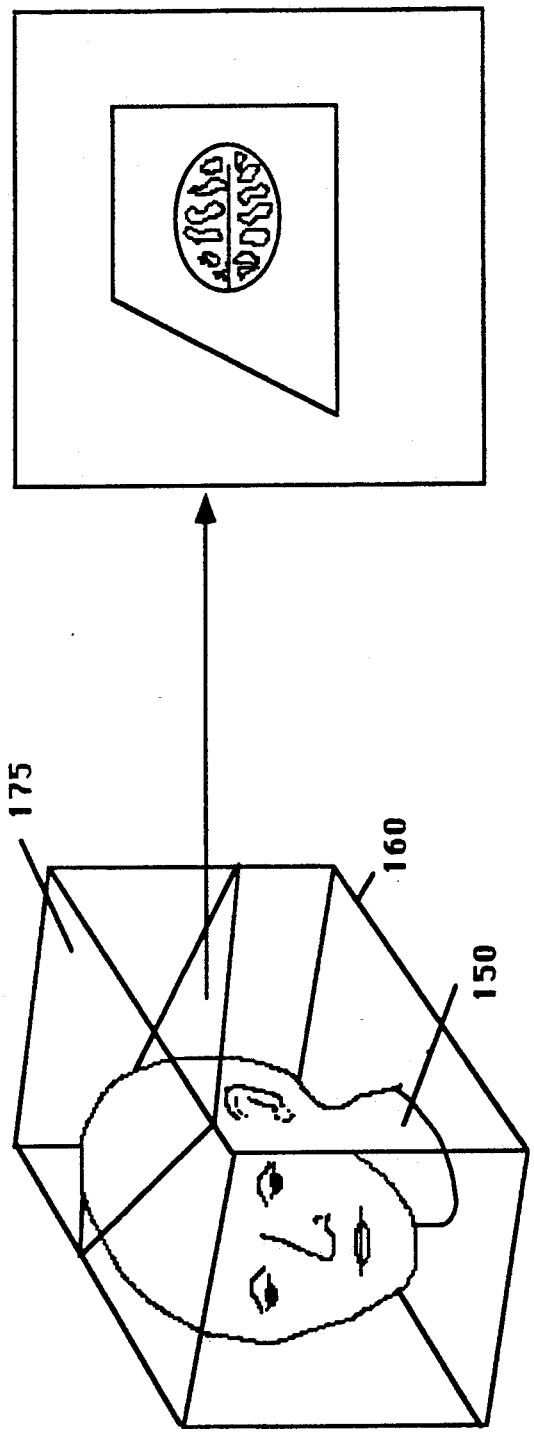

METHOD AND APPARATUS FOR RENDERING OF GEOMETRIC VOLUMES

This is a continuation of application Ser. No. 07/353,449 filed May 18, 1989.

BACKGROUND OF THE INVENTION

1. Field of the Invention:

This method and apparatus of the present invention relates to the field of computer graphics more specifically, it relates to the rendering of volume data on a computer display.

2. Art Background:

The technique of rendering volumes, that is data having three dimensional aspects, is frequently used in the computer graphics field for applications such as the display of images generated through x-ray crystallography, computer tomography, positron emission tomography and computational fluid dynamics.

Volume data is represented by a three dimensional array of volume elements referred to as "voxels". Associated with each voxel are three integer coordinates representing its location in volume space and at least one integer value called its density, representing some property at the location, e.g. temperature or composition, which is not directly related to rendering attributes. On the other hand, geometric data is represented by an x, y, z coordinate position and associated rendering attributes such as color. Geometric data unlike volume data, may be easily rendered for display because the data provides the rendering information necessary to display a geometric image; volume data contains information related to the volume object itself.

Therefore, in order to display volume data, the volume data must be translated out of volume space into a format compatible with the display system space. There are basically two techniques to render volumes on a computer graphics display: geometric and volumetric. In the geometric approach the volume data is fitted to geometric primitives which produces a model comprises of those primitives. In the volumetric approach the volume is rendered directly using either multiplanar reprojection or raycasting techniques.

Fuchs, Optimal Surface Reconstruction for Planar Contours, CACM 20 (1977), describes a geometric algorithm for rendering surfaces contained in volumetric data by reconstructing a 3-dimensional surface from a set of contours drawn on serial slices through the volume. The contours are commonly obtained using semi-automatic edge following routines, which are then tiled using geometric primitives such as triangles, polygons, or bi-cubic patches. These primitives form 3-D polygonal models which can be rendered using conventional techniques. A similar technique for surface reconstruction is described in Cline et al., U.S. Pat. No. 4,729,098. However, the extraction of surface contours frequently requires operator intervention. Large numbers of polygons are required to retain detail. In addition, because the volume data is now represented only by the surface data of the volume; the raw volume data is lost and partial surfaces or objects cannot be displayed.

In an effort to retain surface detail at the voxel level the Cuberille method was developed (Gordon, Image Space Shading of 3-Dimensional Objects, Computer Vision Graphics and Image Processing 29, 377–393 (1985)). This technique creates a binary volume compressed for rendering efficiency representing a surface boundary. The faces of the voxels are rendered as shaded polygons. This technique does not allow for semi-transparent or partial surfaces. Another geometric algorithm, known as Marching Cubes, calculates the intersection of the surface with the voxel cube and generates triangles that give a highly detailed surface approximation. See, Lorenson, et. al. Marching Cubes: A High Resolution 3-D Surface Construction Algorithm, Computer Graphics, Siggraph 1987 Proceedings, pages 163–169 (July 1987). Even more detail is provided by the dividing cubes algorithm, which represents the boundary as a set of points. See Cline, et. al., Two Algorithms For The Reconstruction Of Surface From Tomograms, Medical Physics June 1988 and Cline, U.S. Pat. No. 4,719,585.

However, these methods provide for the surface extraction of the volume; the raw volume data is not maintained. Therefore, any further interaction with the raw volume data is not possible because only the volume surface information is retained. Thus, such functions as partial volumes, transparency, translucency and interaction with a volume, such as picking (i.e., reading data values from volumes or writing data values from volumes) and the imposition of a geometric object on the volume, cannot be performed.

In the compositing technique, the volume data is preprocessed by classifying each voxel according to various rendering attributes such as color, opacity and texture thereby creating a multiplicity of volume representations. The different volume representations are then combined to form a single volume representation to be rendered on a display device. See Drebin, et. al., Volume Rendering, Computer Graphics Siggraph proceedings, pages 65–74, August 1988; LeVoy, Display Of Surfaces From Volume Data, IEEE Computer Graphics and Applications (May 1988) and Goldwasser, et. al., U.S. Pat. No. 4,737,921. However, this technique does not provide for a continuous mapping function. Thus, if the output image to be rendered is significantly larger than the original volume data, significant aliasing occurs.

Raycasting is a simple way of direct voxel rendering. Roth, Raycasting For Modeling Solids, Computer Graphics and Image Processing 18, pages 109–144; Sabella, A Rendering Algorithm For Visualizing 3-D Scalar Fields, Computer Graphics Siggraph 1988 Proceedings, pages 51–55, August 1988; Upson et al., V-Buffer Visible Volume Rendering, Computer Graphics, Siggraph 1988 Proceedings, pages 59–64, August 1988. In the raycasting technique a ray is emitted at each pixel through the volume along the view-vector. The values determined along the ray are combined to be a single value and displayed on the display output. There have been many algorithms developed to determine the output rendered by the ray. For example, the additive reprojection algorithm produces an x-ray like image by averaging the intensities of volume points along the ray. Another raycasting technique assigns color and opacity to density ranges allowing the volume to be viewed as a composition of translucent gels. (See Schlusselberg, et al., 3-Dimensional Display Of Medical Image Volumes, Proceedings of the NCGA, March 1986). Kjiya, et al., Raytracing Volume Densities, Computer Graphics, Siggraph 1984 Proceedings, pages 165–173, describes true raytracing where additional rays are spawned at surface boundaries for the calculation of intersurface reflectance properties. In practice, however, true raytracing has not been used because it is computationally intensive and expensive. In the multiplanar reprojection technique, one or more planes are moved through a volume displaying the density values mapped to some coloring function. However, this technique, like ray-casting, is cumbersome and computation intensive and requires additional renderings for different perspectives.

SUMMARY OF THE INVENTION

It is therefore an object of the present invention to provide a method and apparatus for direct volume rendering using volume primitives.

It is an object of the present invention to provide a method and apparatus for rendering volumes incorporating volume-mapped geometric primitives.

It is further an object of the present invention to provide a method and apparatus for rendering volumes wherein the volumes may be interacted with geometric objects.

In the method and apparatus of the present invention a means is provided to directly render volumes from volume data whereby the resolution of the volume is not lost and the volume data is completely interactive with geometric data.

The volume or portion of the volume to be rendered is aligned to a geometric primitive and a mapping function is generated relating the geometric primitive to the volume or volume portion. The mapping function relates each voxel in volume space to an element or point of the primitive. Thus, the volume is displayed as a function of the geometric primitive the volume or volume portion is mapped to.

In the preferred embodiment the volume or portion of volume to be rendered is bound by one or more geometric primitives and a mapping is generated relating the geometric primitive, such as a 3-D polygon, to the volume. Thereafter, any geometric operation performed on the volume is accomplished by performing the operation on the geometric primitive and using the mapping function to translate the volume into geometry space whereby the volume data is displayed. Preferably, the polygon which bounds the volume is a rectilinear cube such as a normalized cube having its vertices range from $-1$ to $+1$.

By defining the volume as a function of geometric primitives such as a polygon, geometric operations, such as clipping or rotating, may be performed easily on the primitive and the data is used to look up through the mapping function to determine the corresponding volume data to be displayed. Furthermore, geometric data may be easily interacted with the raw volume data because the raw volume data is being directly rendered in the geometry space.

BRIEF DESCRIPTION OF THE DRAWINGS

The objects features and advantages of the method and apparatus of the present invention will be apparent from the following description of the invention in which:

FIG. 4a and 4b illustrate the mapping and display of a volume bounded by a geometric cube.

NOTATION AND NOMENCLATURE

The detailed description which follows is presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE INVENTION

General System Configuration

Figure 1:
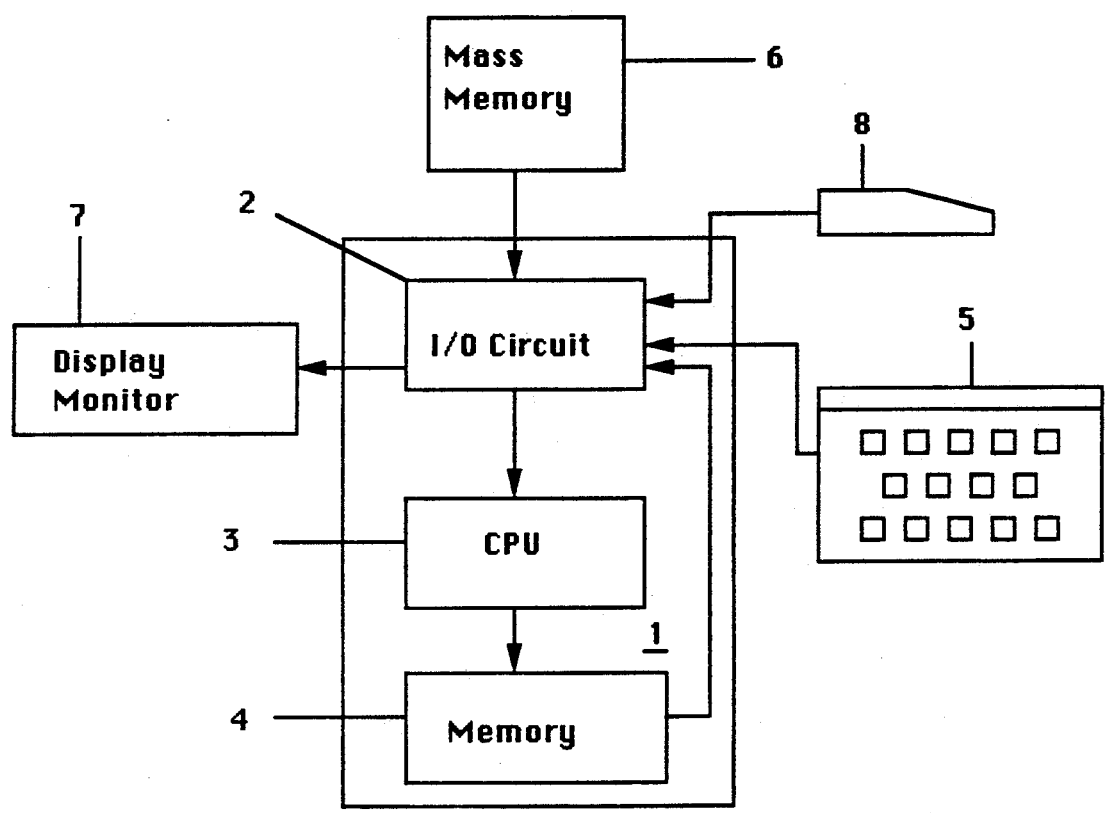
FIG. 1 is a block diagram of a computer system for the rendering of volume data on a computer display.

FIG. 1 shows a typical computer-based system for rendering of volume data on a computer display according to the present invention. Shown there is a computer 1 which comprises three major components. The first of these is the input/output (I/O) circuit 2 which is used to communicate information in appropriately structured form to and from the other parts of the computer 1. Also shown as a part of computer 1 is the central processing unit (CPU) 3 and memory 4. These latter two elements are those typically found in most general purpose computers and almost all special purpose computers. In fact, the several elements contained within computer 1 are intended to be representative of this broad category of data processors. Particular examples of suitable data processors to fill the role of computer 1 include machines manufactured by Sun Microsystems, Inc., Mountain View, Calif. Other computers having like capabilities may of course be adapted in a straightforward manner to perform the functions described below.

Also shown in FIG. 1 is an input device 5, shown in typical embodiment as a keyboard. It should be understood, however, that the input device may actually be a card reader, magnetic or paper tape reader, or other well-known input device (including, of course, another computer or computerized data gathering lab equipment such as computer tomography equipment). A mass memory device 6 is coupled to the I/O circuit 2 and provides additional storage capability for the computer 1. The mass memory may include other programs and the like and may take the form of a magnetic or paper tape reader or other well known device. It will be appreciated that the data retained within mass memory 6, may, in appropriate cases, be incorporated in standard fashion into computer 1 as part of memory 4.

In addition, a display monitor 7 is illustrated which is used to display messages or other communications to the user. Such a display monitor may take the form of any of several well-known varieties of CRT displays. Preferably, the display monitor 7 is a high resolution computer raster display device which can display the volume images rendered according to the process of the present invention. A cursor control 8 is used to select command modes and edit the input data, such as, for example, the scale of the typeface, and provides a more convenient means to input information into the system.

Process Overview

In the method and apparatus of the present invention a volume object or portion of a volume object is aligned with one or more geometric primitives and a mapping function between the geometric primitive in geometry space and the volume object in volume space is generated. Through the use of the mapping function, transformation, viewing and other geometric operations may be performed on the volume simply by performing the geometric operations on the primitives the volume is mapped to and translating the corresponding volume data.

The volume data, that is the voxels representative of the volume object containing the attributes of the volume at a particular location in volume space, are stored in memory according to each voxel's location in a 3-D array of voxels representative of the volume object. To display the volume object the volume object is described in terms of at least one geometric primitive defined by an $\{x,y,z\}$ reference frame, for example, a cube. The geometric primitive or primitives used should be of such a size and aligned in a manner that the volume or portion of the volume to be rendered can be mapped to the primitive. It is preferable that the primitive used is normalized in order to simplify subsequent computations that may be performed such as magnification, translation or rotation of the image.

Figure 2:
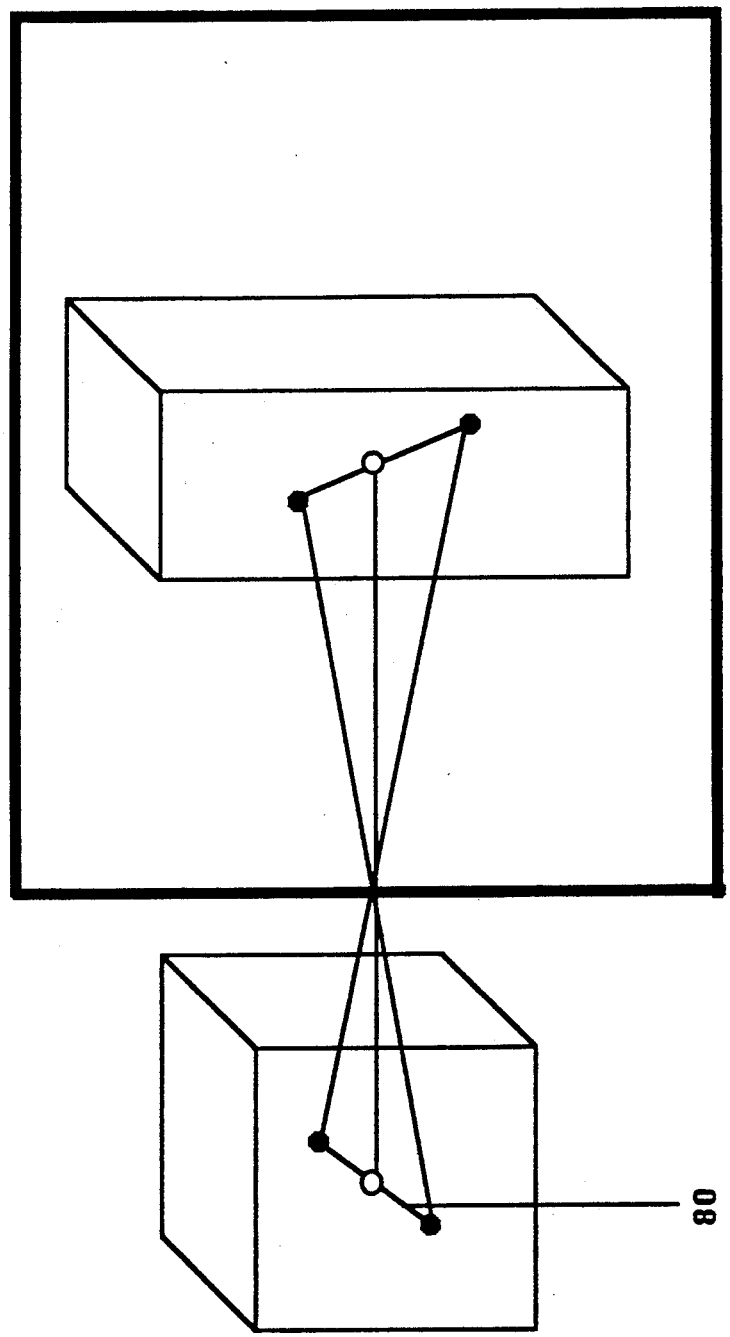
FIG. 2 illustrates the mapping of volume elements in volume space to elements in geometry space.

For example, referring to FIG. 2, a portion of a volume representative of a volume vector 80 can be mapped to a geometric vector and displayed in screen space. This vector once mapped, may easily be rotated and translated in the geometry space simply by performing the rotation/translation operations on the geometric vector the volume vector is mapped to and looking up the corresponding volume elements using the mapping function.

Figure 3C:
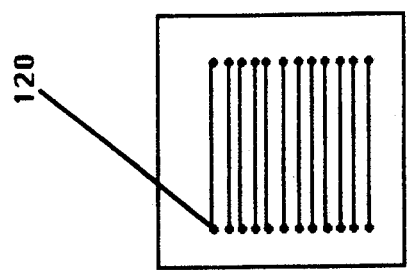
FIG. 3a, 3b and 3c illustrate an application of the preferred embodiment of the present invention.
Figure 3B:
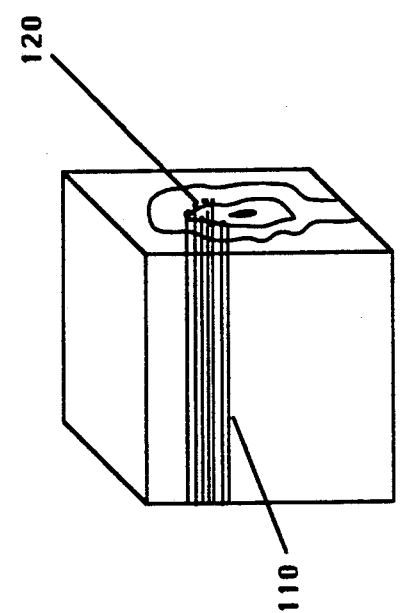
Figure 3A:
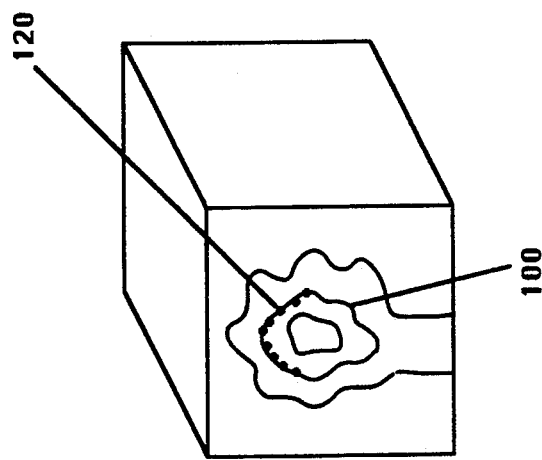

This is particularly useful for the technique of curved surface extraction using volume vector primitives. For example, referring to FIGS. 3a, 3b and 3c, a volume object may represent human tissue and/or organs wherein the volume contains capillaries 100 that are located throughout the volume. It is sometimes desirable to extract a capillary and to view it from a variety of perspectives to determine the exact path or shape of the capillary through the tissues/organs representative of the volume. This is achieved by mapping volume vectors 110 to geometric vectors at points 120 along the curved surface, e.g., a capillary. Once the mapping is performed, the geometric vectors may be rotated and corresponding volume data is mapped thereby rendering a display showing the capillary from different perspectives, for example the perspective illustrated in FIG. 3c.

Preferably, the volume is mapped to one or more geometric primitives which form a three dimensional object such as a rectilinear cube. The cube is aligned such that it bounds the volume. As illustrated in FIG. 4a, the volume object 150 is bounded by cube 160. A mapping function is generated between the voxels comprising the volume and the $\{x,y,z\}$ coordinates of the cube. Once the mapping function is generated, a variety of geometric operations may be performed on the volume object through operations performed on the cube. For example, a portion 175 of the volume 170 may be removed by performing clipping operations on the cube 160 and the resulting image of the volume revealed can be easily displayed, as illustrated in FIG. 4b.

The mapping function provides a mathematical correspondence between each voxel of the volume object in volume space (also referred to as (u,v,w) space) and a vertex or grid point of the geometric primitive in $\{x,y,z\}$ space (geometry space). It can be said that the volume object is "fitted" to the geometric primitive such that boundaries of the volume are mapped to the boundaries of the geometric primitive.

Thus, the mapping function links the location(s) of the voxels stored in memory to a particular x,y,z coordinate location of the geometric primitive(s) the volume data is mapped to. The mapping function used can be any order function. The function can be a zero order function wherein each voxel is mapped to the closest vertex in geometry space. For example, if a volume has the dimensions (10×20×30) and it is mapped to a normalized rectilinear cube having its vertices located between −1 and 1, then the voxel at the position in the array (5, 10, 15) would be mapped to the vertex of the cube at the coordinate position $\{0, 0, 0\}$ and the voxel at the position in the array (10, 20, 30) would be mapped to the vertex at coordinate location $\{1, 1, 1\}$. The voxels between the position (1, 1, 1) and (10, 20, 30) in volume space are mapped to the closest vertex to the value computed using a size proportion calculation between volume space and geometry space. In the present example the u:x proportion is equal to 10:2 because the number of voxels in u is equal to 10 and the number of vertices in x is 2 (−1 to 1). Thus to the mapping function may be $$x_v = \frac{U_V}{5} - 1.$$

Figure 5:
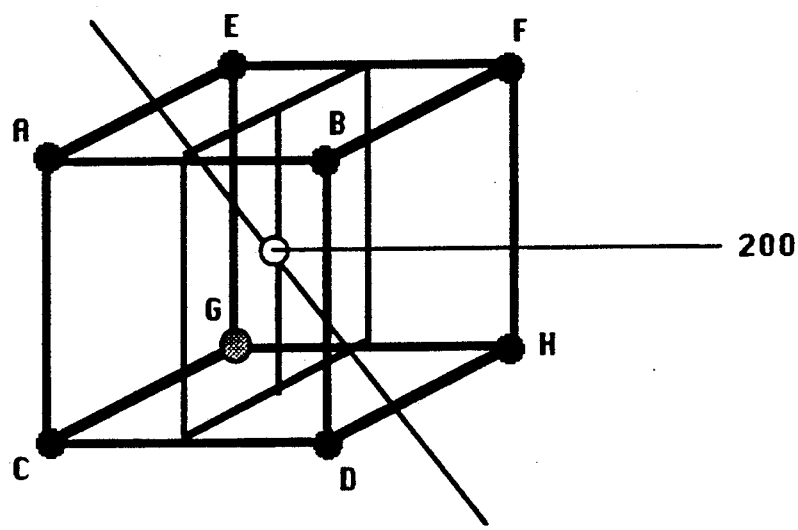
FIG. 5 illustrates a trilinear mapping function.

The function may also be a first order function referred to as a trilinear function wherein a weighted average calculation is performed on the eight closest vertices in geometry space to determine the location of the volume vertex in geometry space. Using a first order function produces a smoothing effect thereby minimizing the amount of aliasing which occurs when the volume data is mapped. Referring to FIG. 5, a voxel 200 is mapped to a bounding cube by determining the eight closest verticies in geometry space illustrated by vertices, a, b, c, d, e, f, g and h. The coordinate location of the voxel is then determined according to the vertices and the voxel's distance from these vertices, as follows:

$$X = \{[(a*FRACT(u) + b*(1 - FRACT(u)))*FRACT(v) +$$
$$(c*FRACT(u) + d*(1 - FRACT(u)))* (1 -$$
$$FRACT(v))]*FRACT(w) + [(e*FRACT(u) +$$
$$f*(1 - FRACT(u))))*FRACT(v) + (g*FRACT(u) +$$
$$h*(1 - FRACT(u)))*(1 - FRACT(v))]*(1 - FRACT(w))\}$$

where X is the geometric location of the voxel 200 at location {u,v,w} in volume space, a, b, c, d, e, f, g, and h are the eight {x,y,z} coordinate locations of the corners of the cube which surround the volume coordinate to be determined and FRACT is a function which determines the fractional portion of the coordinate. The distance of the voxel from the eight vertices is factored in the equation through the weights, i.e. FRACT(u), 1-FRACT(u), FRACT(v), 1-FRACT(v), FRACT(w), and 1-FRACT(w).

Once the mapping function has been determined, any geometric operation modification or manipulation which is performed on geometric objects may be performed on the volume object through the geometric primitive the volume is mapped to. To achieve different viewing dimensions, aspect ratios or perspectives of the volume data, the geometric primitive is multiplied by a transformation matrix which accordingly modifies the volume data mapped to the geometric primitive.

In addition, volume primitives are defined. The volume primitives are primitives such as a point, vector, polygon or ray which have definition in volume space and correspondingly in the geometry space according to the mapping performed. Thus, for example, a point has a location in {x,y,z} space and (u,v,w) space, a vector has two points in {x,y,z} and (u,v,w) space which define the end points of the vector. Similarly, a polygon has a plurality of points in {x,y,z} and (u,v,w) space which define the boundaries of the polygon. A ray has a single point in {x,y,z} space which maps to a plurality of points in (u,v,w) space. The primitives may be used to add to, subtract or otherwise interact with the volume data. For example, a primitive may be used to slice away a portion of the volume to expose an interior surface. This is illustrated in FIG. 4a and 4b wherein a polygon is used to slice away a portion of the volume to expose an interior surface of the volume. The primitives may also be used to generate a geometric image to interact with the volume in volume space where the effect may be displayed. This is particularly useful in medical emission therapy wherein the medical practitioner can preview the interaction of a partical beam or laser beam created using primitives with human tissue which has been generated in the volume space. Thus a more realistic image is provided because the geometric image interacts with the raw volume data and not the surface extraction data of the volume.

While the invention has been described in conjunction with the preferred embodiment, it is evident that numerous alternatives, modifications, variations and uses will be apparent to those skilled in the art in light of the foregoing description.

It is claimed:

1. A method for rendering volume objects on a computer graphics display, said method comprising the steps of:

storing volume data representative of at least a portion of a volume object in memory, said volume object being represented in a (u,v,w) volume space;

generating at least one geometric primitive to correspond to the volume object, said corresponding geometric primitive being represented as a plurality of geometry coordinates including a plurality of boundary coordinates, said plurality of boundary coordinates defining the corresponding geometric primitive, said corresponding geometric primitive being represented within an {x,y,z} coordinate space having a reference frame, said geometry coordinates being defined as a function of the reference frame, said geometry coordinates representing a plurality of corresponding displaying pixels on a computer graphics display;

aligning the volume object to the corresponding geometric primitive;

generating a mapping function which maps said volume data to said geometry coordinates of said corresponding geometric primitive using the boundary coordinates;

performing geometric operations on the corresponding geometric primitive the volume object is mapped to, thereby resulting in a modified geometric primitive; and displaying the volume data according to the geometry coordinates of the modified geometric primitive using the mapping function determined, whereby the volume object displayed is modified according to the geometric operations performed on the corresponding geometric primitive.

2. The method of claim 1 wherein said corresponding geometric primitive is a rectilinear cube and said mapping function is a zero order function, said boundary coordinates defining said rectilinear cube being the geometry coordinates of its vertices, the zero order function mapping the volume data to the geometry coordinates closest to a plurality of ideal geometry coordinates, said ideal geometry coordinates being determined as a function of the proportion between the number of volume elements and the distance between the vertices of the rectilinear cube in each dimension of the {x,y,z} reference frame.

3. The method of claim 1 wherein said corresponding geometric primitive is a rectilinear cube and said mapping function is a first order function, said boundary coordinates defining said rectilinear cube being the geometry coordinates of its vertices, the first order function trilinearly interpolating the volume data to determine the geometry coordinates the volume data is mapped to.

4. The method of claim 3 wherein the method for trilinearly interpolating the geometric data comprises the steps of:

determining the geometry coordinates of the eight closest vertices of the rectilinear cube which surrounds the volume object to be mapped; and computing the geometry coordinates where the volume data are mapped to, as a function of the geometry coordinates of the eight closest vertices and their distance from the volume data, said function being defined as:

$$X = \{[(a*FRACT(u) + b*(1 - FRACT(u)))*FRACT(v) + (c*FRACT(u) + d*(-FRACT(u)))*(1 - FRACT(v))]*FRACT(w) + [(e*FRACT(u) + f*(1 - FRACT(u))))*FRACT(v) + (g*FRACT(u) + h*(1 - FRACT(u)))*(1 - FRACT(v))]*(1 - FRACT(w))\}$$

where x = the mapped geometry coordinates of the volume data (u,v,w), a, b, c, d, e, f, g, and h are the {x,y,z} geometry coordinates of the eight closest vertices of the rectilinear cube which surrounds the volume object to be determined and FRACT is a function which determines the fractional portion of the volume data (u,v,w).

5. The method of claim 1 wherein said volume object is one of a plurality of volume primitives, said volume primitives comprising a point, a vector, a polygon and a ray.

6. The method of claim 1 wherein the geometric operation performed is the multiplication of the corresponding geometric primitive by a transformation matrix which rotates the corresponding geometric primitive and therefore rotates the displayed volume object.

7. The method of claim 1 wherein the geometric operation performed is the multiplication of the corresponding geometric primitive by a transformation matrix which changes the dimension of the corresponding geometric primitive thereby changing the size of the displayed volume object.

8. The method of claim 1 wherein the geometric operation performed is the multiplication of the corresponding geometric primitive by a transformation matrix which translates the corresponding geometric primitive thereby translating the volume object displayed.

9. The method of claim 1 wherein the geometric operation performed is the interaction of an interacting geometric primitive with the corresponding geometric primitive the volume object is mapped to whereby a volume primitive mapped to said interacting geometric primitive is interacted with the volume object displayed.

10. The method of claim 9 wherein the interaction of the interacting geometric primitive is to superimpose the interacting geometric primitive on the corresponding geometric primitive the volume object is mapped to thereby superimposing a volume primitive mapped to the interacting geometric primitive on the volume object displayed.

11. The method of claim 9 wherein the interaction of the interacting geometric primitive is the removal of a portion of the corresponding geometric primitive the volume object is mapped to, said portion determined according to the size, shape and location of the interacting geometric primitive whereby the corresponding portion of the volume object displayed is removed.

12. The method of claim 9 wherein the interaction of the interacting geometric primitive is the extraction of portions of the corresponding geometric primitive the volume object is mapped to, said portion determined according to the size, shape and location of the interacting geometric primitive, whereby the corresponding portion of the volume object extracted is displayed.

13. A method for rendering volume objects on a computer graphics display wherein the volume object is displayed in screen space, said method comprising the steps of:

storing in memory volume data representative of at least a portion of the volume object, said volume object being represented in a (u,v,w) volume space;

generating at least one geometric primitive corresponding to the volume object which bounds the volume object in three dimensions, said corresponding geometric primitive being represented as a plurality of geometry coordinates including a plurality of boundary coordinates, said plurality of boundary coordinates defining the corresponding geometric primitive, said corresponding geometric primitive being represented in an {x,y,z} geometry space, said geometry space having a reference frame, said geometry coordinates being defined as a function of the reference frame, said geometry coordinates representing a plurality of corresponding displaying pixels in the screen space of the computer graphics display;

generating a mapping function which maps said volume data to one of said geometry coordinates of said corresponding geometric primitive which bounds the volume object using the boundary coordinates;

performing geometric operations on the corresponding geometric primitive the volume object is mapped to, thereby resulting in a modified geometric primitive; and displaying the volume data according to the geometry coordinates of the modified geometric primitive using the mapping function determined, whereby the volume object displayed is modified according to the geometric operations performed on the corresponding geometric primitive.

14. The method of claim 13 wherein the geometric primitive the volume object is mapped to is a rectilinear cube, the boundary coordinates defining the rectilinear cube being the geometry coordinates of its vertices.

15. The method of claim 14 wherein said mapping function is a zero order function, the zero order function mapping the volume data to the geometry coordinates closest to a plurality of ideal geometry coordinates, said ideal geometry coordinates determined as a function of the proportion between the number of volume elements and the distance between the vertices of the rectilinear cube in each dimension of the {x,y,z} reference frame.

16. The method of claim 14 wherein said mapping function is a first order function, the first order function trilinearly interpolating the volume data to determine the geometry coordinates the volume data is mapped to.

17. The method of claim 16 wherein the method for trilinearly interpolating the geometric data comprises the steps of:

determining the geometry coordinates of the eight closest vertices of the rectilinear cube which surrounds the volume object to be mapped; and computing the geometry coordinates where the volume data are mapped to, as a function of the geometry coordinates of the eight closest vertices and their distance from the volume data, said function being defined as:

$$X = \{[(a*FRACT(u) + b*(1 - FRACT(u)))*FRACT(v) +$$
$$(c*FRACT(u) + d*(-FRACT(u)))* (1 -$$
$$FRACT(v))]*FRACT(w) + [(e*FRACT(u) +$$
$$f*(1 - FRACT(u))))*FRACT(v) + (g*FRACT(u) +$$
$$h*(1 - FRACT(u)))*(1 - FRACT(v))]*(1 - FRACT(w))\}$$

where x=the mapped geometry coordinates of the volume data (u,v,w), a, b, c, d, e, f, g, and h are the {x,y,z} geometry coordinates of the eight closest vertices of the rectilinear cube which surrounds the volume object to be determined and FRACT is a function which determines the fractional portion of the volume data (u,v,w).

18. The method of claim 13 wherein the geometric operation performed is the multiplication of the corresponding geometric primitive by a transformation matrix which rotates the corresponding geometric primitive and therefore rotates the displayed volume object.

19. The method of claim 13 wherein the geometric operation performed is the multiplication of the corresponding geometric primitive by a tranformation matrix which changes the dimensions of the corresponding geometric primitive thereby changing the size of the displayed volume object.

20. The method of claim 13 wherein the geometric operation performed is the multiplication of the corresponding geometric primitive by a transformation matrix which translates the corresponding geometric primitive thereby translating the volume object displayed.

21. The method of claim 13 wherein the geometric operation performed is the interaction of an interacting geometric primitive with the corresponding geometric primitive the volume object is mapped to whereby a volume primitive mapped to said interacting geometric primitive is interacted with the volume object displayed.

22. The method of claim 21 wherein the interaction of the interacting geometric primitive is to superimpose the interacting geometric primitive on the corresponding geometric primitive the volume object is mapped to thereby superimposing a volume primitive mapped to the interacting geometric primitive on the volume object displayed.

23. The method of claim 21 wherein the interaction of the interacting geometric primitive is the removal of a portion of the corresponding geometric primitive the volume object is mapped to, said portion determined according to the size, shape and location of the interacting geometric primitive whereby the corresponding portion of the volume object displayed is removed.

24. The method of claim 21 wherein the interaction of the interacting geometric primitive is the extraction of portions of the corresponding geometric primitive the volume object is mapped to, said portion determined according to the size, shape and location of the interacting geometric primitive, whereby the corresponding portion of the volume object extracted is displayed.

25. An apparatus for rendering volume objects on a computer graphics display, said apparatus comprising:

means for storing volume data representative of at least a portion of a volume object in memory, said volume object being represented in a (u,v,w) volume space;

means for generating at least one geometric primitive to correspond to the volume object, said corresponding geometric primitive being represented as a plurality of geometry coordinates including a plurality of boundary coordinates, said plurality of boundary coordinates defining the corresponding geometric primitive, said corresponding geometric primitive being represented in an {x,y,z} geometry coordinate space having a reference frame, said geometry coordinates being defined as a function of the reference frame, said geometry coordinates representing a plurality of pixels on a computer graphics display;

means for aligning the volume object to the corresponding geometric primitive;

means for generating a mapping function which maps said volume data to said geometry coordinates of said corresponding geometric primitive using the boundary coordinates;

means for performing geometric operations on the corresponding geometric primitive the volume object is mapped to thereby resulting in a modified geometric primitive; and means for displaying the volume data according to the geometry coordinates of the modified geometric primitive using the mapping function determined whereby the volume object displayed is modified according to the geometric operations performed on the corresponding geometric primitive.

26. The apparatus of claim 25 wherein said corresponding geometric primitive is a rectilinear cube and said means for generating a mapping function generates a zero order function, said boundary coordinates defining said said rectilinear cube being the geometry coordinates of its vertices, said means for generating a mapping function comprising a zero order function mapping means for mapping the volume data to the geometry coordinates closest to a plurality of ideal geometry coordinates, said ideal geometry coordinates being determined as a function of the proportion between the number of volume elements and the distance between the vertices of the rectilinear cube in each dimension of the {x,y,z} reference frame.

27. The apparatus of claim 25 wherein said corresponding geometric primitive is a rectilinear cube and said means for generating a mapping function generates a first order function, said boundary coordinates defining said rectilinear cube being the geometry coordinates of its vertices, said means for generating a mapping function comprising a first order function mapping means for trilinearly interpolating the volume data to determine the geometry coordinates the volume data is mapped to.

28. The apparatus of claim 27 wherein the first order function means for trilinearly interpolating the volume data comprises:

means for determining the geometry coodinates of the eight closest vertices of the rectilinear cube which surrounds the volume object to be mapped; and means for computing the geometry coordinate where each of the volume data is mapped to, as a function of the geometry coordinates of the eight closed vertices and their distance from the volume data, said function being defined as:

$$X = \{[(a*FRACT(u) + b*(1 - FRACT(u)))*FRACT(v) +$$
$$(c*FRACT(u) + d*(-FRACT(u)))* (1 -$$
$$FRACT(v))]*FRACT(w) + [(e*FRACT(u) +$$
$$f*(1 - FRACT(u))))*FRACT(v) + (g*FRACT(u) +$$
$$h*(1 - FRACT(u)))*(1 - FRACT(v))]*(1 - FRACT(w))\}$$

where x = the mapped geometry coordinates of the volume data (u,v,w), a, b, c, d, e, f, g, and h are the {x,y,z} geometry coordinates of the eight closest vertices of the rectilinear cube which surrounds the volume object to be determined and FRACT is a function which determines the fractional portion of the volume data (u,v,w).

29. The apparatus of claim 25 wherein said volume object is one of a plurality of volume primitives, said volume primitives comprising a point, a vector, a polygon and a ray.

30. The apparatus of claim 25 wherein said means for performing geometric operations comprises means for multiplying the corresponding geometric primitive by a transformation matrix which rotates the corresponding geometric primitive and therefore rotates the displayed volume object.

31. The apparatus of claim 25 wherein said means for performing geometric operations comprises means for multiplying the corresponding geometric primitive by a transformation matrix which changes the dimension of the corresponding geometric primitive thereby changing the size of the displayed volume object.

32. The apparatus of claim 25 wherein said means for performing geometric operations comprises means for multiplying the corresponding geometric primitive by a transformation matrix which translates the corresponding geometric primitive thereby translating the volume object displayed.

33. The apparatus of claim 25 wherein said means for performing geometric operations comprises means for interacting an interacting geometric primitive with the corresponding geometric primitive the volume object is mapped to whereby a volume primitive mapped to said interacting geometric primitive is interacted with the volume object displayed.

34. The apparatus of claim 33 wherein said means for interacting an interacting geometric primitive is to superimpose the interacting geometric primitive on the corresponding geometric primitive the volume object is mapped to thereby superimposing a volume primitive mapped to the interacting geometric primitive on the volume object displayed.

35. The apparatus of claim 33 wherein said means for interacting an interacting geometric primitive comprises means to remove a portion of the corresponding geometric primitive the volume object is mapped to, said portion determined according to the size, shape and location of the interacting geometric primitive whereby the corresponding portion of the volume object displayed is removed.

36. The apparatus of claim 33 wherein said means for interacting an interacting geometric primitive comprises means to extract portions of the corresponding geometric primitive the volume object is mapped to, said portion determined according to the size shape and location of the interacting geometric primitive, whereby the corresponding portion of the volume object extracted is displayed.

37. An apparatus for rendering volume objects on a computer graphics display, said apparatus comprising:

means for storing in memory volume data representative of at least a portion of a volume object, said volume object represented in a (u,v,w) volume space;

means for generating at least one geometric primitive to correspond to the volume object which bounds the volume object in three dimensions, said corresponding geometric primitive being represented as a plurality of geometry coordinates including a plurality of boundary coordinates, said plurality of boundary coordinates defining the corresponding geometric primitive, said corresponding geometric primitive being represented in an {x,y,z} geometry space, said geometry space having a reference frame, said corresponding geometric primitive being defined as a function of the reference frame, said geometry coordinates representing a plurality of corresponding displaying pixels in the screen space of the computer graphics display;

means for generating a mapping function which maps said volume data to said geometry coordinates of said corresponding geometric primitive which bounds the volume object using the boundary coordinates;

means for performing geometric operations on the corresponding geometric primitive the volume object is mapped to thereby resulting in a modified geometric primitive; and means for displaying the volume data according to the geometry coordinates of the modified geometric primitive using the mapping function determined whereby the volume object displayed is modified according to the geometric operations performed on the corresponding geometric primitive.

38. The apparatus of claim 37 wherein the geometric primitive the volume object is mapped to is a rectilinear cube, the boundary coordinates defining the rectilinear cube being the geometry coordinates of its vertices.

39. The apparatus of claim 38 wherein said means for generating a mapping function generates a zero order function, and comprises a zero order function mapping means for mapping the volume data to the geometry coordinates closest to ideal geometry coordinates, said ideal geometry coordinates being determined as a function of the proportion between the number of volume elements and the distance between the vertices of the rectilinear cube in each dimension of the {x,y,z} reference frame.

40. The apparatus of claim 38 wherein said means for generating a mapping function generates a first order function, and comprises a first order function means for trilinearly interpolating the volume data to determine the geometry coordinates the volume data is mapped to.

41. The apparatus of claim 40 wherein the first order function means for trilinearly interpolating the volume data comprises:

means for determining the geometry coordinates of the eight closest vertices of the rectilinear cube which surrounds the volume object to be mapped;

means for computing the geometry coordinates where each of the volume data is mapped to, as a function of the geometry coordinates of the eight closest vertices and their distance from the volume data, said function being defined as:

$$X = \{[(a*FRACT(u) + b*(1 - FRACT(u)))*FRACT(v) +$$
$$(c*FRACT(u) + d*(-FRACT(u)))* (1 -$$
$$FRACT(v))]*FRACT(w) + [(e*FRACT(u) +$$
$$f*(1 - FRACT(u))))*FRACT(v) + (g*FRACT(u) +$$
$$h*(1 - FRACT(u)))*(1 - FRACT(v))]*(1 - FRACT(w))\}$$

where x=the mapped geometry coordinates of the volume data (u,v,w), a, b, c, d, e, f, g, and h are the {x,y,z} geometry coordinates of the eight closest vertices of the rectilinear cube which surrounds the volume object to be determined and FRACT is a function which determines the fractional portion of the volume data (u,v,w).

42. The apparatus of claim 37 wherein said means for performing geometric operations comprises means for multiplying the corresponding geometric primitive by a transformation matrix which rotates the corresponding geometric primitive and therefore rotates the displayed volume object.

43. The apparatus of claim 37 wherein said means for performing geometric operations comprises means for multiplying the corresponding geometric primitive by a transformation matrix which changes the dimensions of the corresponding geometric primitive thereby changing the size of the displayed volume object.

44. The apparatus of claim 37 wherein said means for performing geometric operations comprises means for multiplying the corresponding geometric primitive by a transformation matrix which translates the corresponding geometric primitive thereby translating the volume object displayed.

45. The apparatus of claim 37 wherein said means for performing geometric operations comprises means for interacting an interacting geometric primitive with the corresponding geometric primitive the volume object is mapped to whereby the interacting geometric primitive is interacted with the volume object displayed.

46. The apparatus of claim 45 wherein said means for interacting an interacting geometric primitive comprises means to superimpose the interacting geometric primitive on the corresponding geometric primitive the volume object is mapped to thereby superimposing a volume primitive mapped to the interacting geometric primitive on the volume object displayed.

47. The apparatus of claim 45 wherein said means for interacting an interacting geometric primitive comprises means to remove a portion of the corresponding geometric primitive the volume object is mapped to, said portion determined according to the size, shape and location of the interacting geometric primitive whereby the corresponding portion of the volume object displayed is removed.

48. The apparatus of claim 45 wherein said means for interacting an interacting geometric primitive comprises means to extract portions of the corresponding geometric primitive the volume data is mapped to, said portion determined according to the size, shape and location of the interacting geometric primitive, whereby the corresponding portion of the volume object extracted is displayed.

* * * * *